Sept. 6, 1966  M. B. TILLOU II  3,270,977
STRAND DISTRIBUTING DEVICE FOR OPEN-TOP CONTAINERS
Filed May 6, 1964  3 Sheets-Sheet 1

INVENTOR.
M. B. TILLOU II
BY
S. Gundersen
ATTORNEY

Sept. 6, 1966 M. B. TILLOU II 3,270,977
STRAND DISTRIBUTING DEVICE FOR OPEN-TOP CONTAINERS
Filed May 6, 1964 3 Sheets-Sheet 2

Sept. 6, 1966 M. B. TILLOU II 3,270,977
STRAND DISTRIBUTING DEVICE FOR OPEN-TOP CONTAINERS
Filed May 6, 1964 3 Sheets-Sheet 3

United States Patent Office 3,270,977
Patented Sept. 6, 1966

3,270,977
STRAND DISTRIBUTING DEVICE FOR
OPEN-TOP CONTAINERS
Manley B. Tillou II, Buffalo, N.Y., assignor to Western Electric Company, Incorporated, New York, N.Y., a corporation of New York
Filed May 6, 1964, Ser. No. 365,335
5 Claims. (Cl. 242—82)

This invention relates to a device for distributing a strand and particularly a device for distributing a strand in a take-up barrel.

In the manufacture of tinsel conductors for telephone cords, it is advantageous to be able to manufacture tinsel conductors for different types of telephone cords on the same manufacturing line with a minimum change to the line. In the manufacture of tinsel conductors for spring cords, the tinsel conductors are jacketed with a softer plastic than the tinsel conductors used in straight cords.

U.S. Patent 3,052,010 discloses a plurality of distributors which will distribute a tinsel conductor in a barrel. The application filed March 26, 1962, in the name of W. G. Pflugrad and having Serial No. 182,583, now Patent 3,135,038, discloses improved deflectors for use at higher line speeds. While these deflectors will satisfactorily distribute the tinsel conductors having a harder jacket, difficulty has been experienced with tinsel conductors having a softer jacket. Tube-type deflectors are also known in the art but are unsatisfactory in that strands having jackets of softer plastic material tend to back up in the tube thereby blocking the passage of the strand through the tube.

Due to the fragile nature of the tinsel conductors, it is extremely important that they be properly distributed in a take-up barrel. Conductors which are improperly distributed in the take-up barrel will break and knot when pulled from the take-up barrel at the high line speeds used in the manufacture of telephone cords.

It is, therefore, an object of the invention to provide a deflector which will properly distribute a strand in an open-top container.

It is a further object of the invention to provide a deflector which will properly distribute tinsel conductors having dissimilar jacket characteristics in a take-up barrel.

With these and other objects in view, the instant invention contemplates providing an arcuate plate mounted for rotation about a vertical axis and curved along its lower portion to distribute a strand into an open-top container.

A more complete understanding of the invention can be obtained by reference to the detailed description which follows when taken in conjunction with the drawings, wherein.

Figure 1:
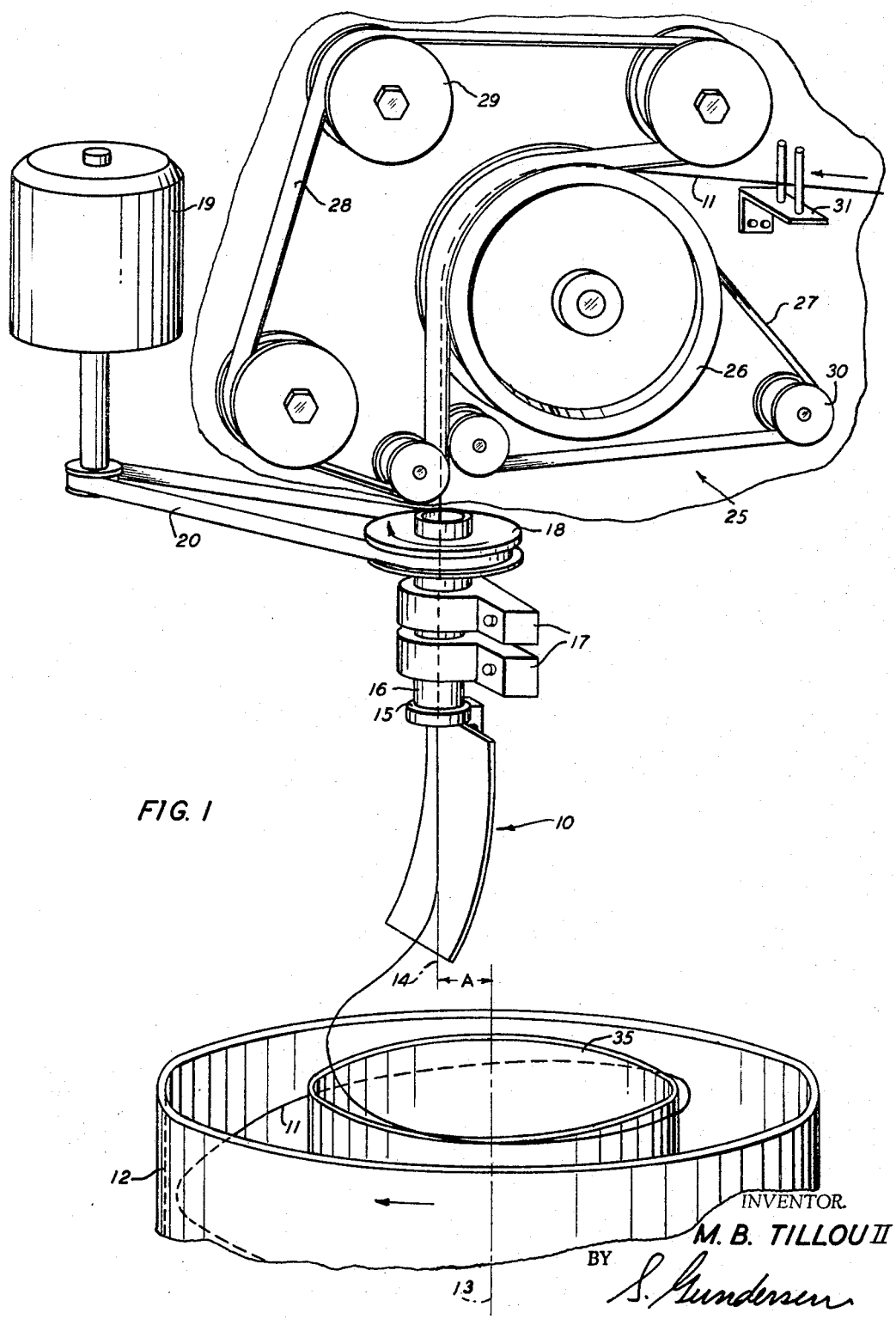
FIG. 1 is a side elevational view of a device embodying the principles of the invention.

In FIG. 1 a deflector generally indicated by the numeral 10 deflects and coils a strand 11 into a take-up barrel 12. The take-up barrel 12 is rotated about its longitudinal axis 13. The take-up barrel 12 may be rotated by any conventional facility as are well known in the art.

Deflector 10 is rotated about a vertical axis 14 which is substantially parallel to the axis 13 about which the take-up barrel 12 is rotated. Axes 13 and 14 are spaced one from the other a distance indicated by the letter A.

The deflector 10 is mounted on a collar 15 which is keyed to a hollow shaft 16 for rotation therewith. The hollow shaft 16 is mounted by bearings 17 for rotation about its longitudinal axis. The longitudinal axis of the hollow shaft 16 is coincident with the vertical axis 14 about which the deflector 10 is rotated. Pulley 18 is also keyed to hollow shaft 16 and is driven by motor 19 and belt 20 to rotate the hollow shaft 16 about its longitudinal axis.

A belt capstan generally indicated by the numeral 25 picks up the strand 11 from a manufacturing line and discharges the strand 11 along a line which coincides with the vertical axis 14. The strand 11 upon striking deflector 10 is deflected from the vertical axis 14 along the lower curved portion of the deflector 10 into the take-up barrel 12; and as the deflector 10 rotates about the vertical axis 14, the strand 11 is coiled or looped into the take-up barrel 12.

The belt capstan 25 may be driven in any conventional manner, for example, a motor (not shown) may drive the shaft of sheave 26 to drive belts 27 and 28 so as to pull the strand 11 through the capstan 25. Sheaves 29 and 30 may be mounted in a conventional manner for movement relative to the sheave 26 to adjust the tension on capstan belts 27 and 28. Fixed guide 31 guides the strand 11 into the capstan 25.

The bearings 17, motor 19 and capstan 25 may be supported in their respective positions in any conventional manner as will be readily understood by one skilled in the art.

Figure 2:
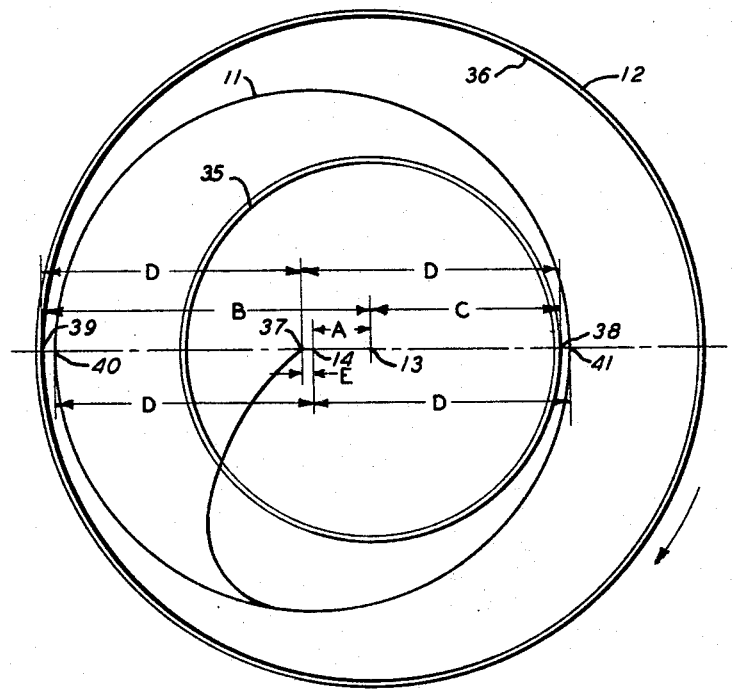
FIG. 2 is an enlarged horizontal view looking into the take-up barrel of the apparatus of FIG. 1.

As is more clearly seen in FIG. 2, the take-up barrel 12 is provided with an inner core 35 which is concentric with the longitudinal axis 13. The strand 11 is deposited in the take-up barrel 12 between the inner core 35 and the inner wall 36 of the take-up barrel 12.

As discussed previously, the vertical axis 14 is displaced a distance A from the longitudinal axis 13. The distance A is determined in the following manner. The radius of the inner wall 36 from the longitudinal axis 13 is indicated by the letter B. The outside radius of the inner core 35 from the longitudinal axis 13 is indicated by the letter C. The distances B and C are added together and divided by 2 to find the location of point 37 which is midway between points 38 and 39. The distance between point 37 and points 38 and 39 is indicated by the letter D. The vertical axis 14 is displaced from point 37 a distance indicated by the letter E. The distance E is the same as the distance between points 39 and 40 and points 38 and 41. As shown in FIG. 2, the distance between the vertical axis 14 and the points 40 and 41 is also equal to the distance D.

As the deflector 10 is rotated about the vertical axis 14, the strand 11 is looped out in a circular path which is generally concentric to the vertical axis 14. The radius of this loop from the vertical axis to point 40 or 41 is equal to the distance D. The point 40 is, therefore, the closest point at which the strand 11 approaches the inner wall 36 of take-up barrel 12; and point 41 is the closest point at which the strand 11 approaches the outer diameter of the inner core 35. Vertical axis 14 is, therefore, spaced from the midpoint 37 a distance E sufficient to distribute the strand 11 in the take-up barrel 12 without striking the barrel 12 or the core 35.

Figure 3:
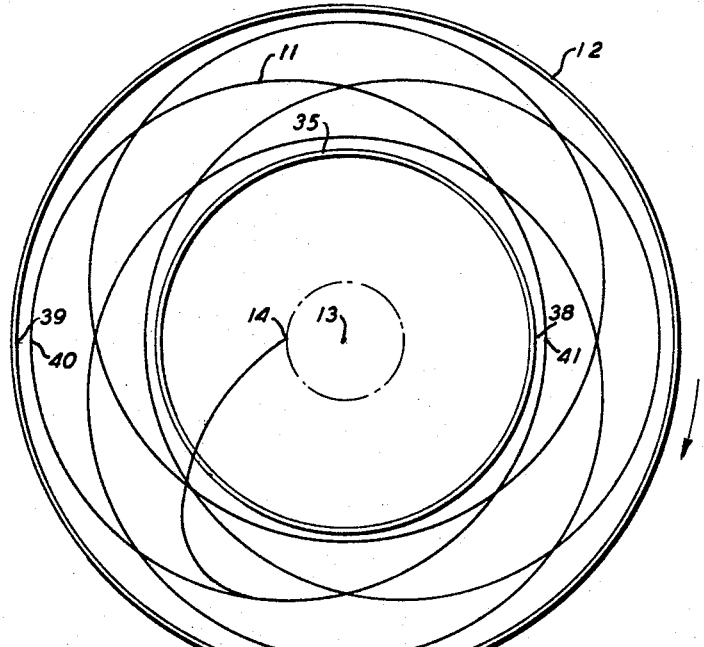
FIG. 3 is the same view as FIG. 2 emphasizing different details.

FIG. 3 illustrates the pattern in which the strand 11 is distributed in the take-up barrel 12 as the take-up barrel 12 rotates beneath the distributor 10. The vertical axis 14 about which the distributor 10 rotates maintains the same relative position with respect to the longitudinal axis 13. However, as the vertical axis 14 is eccentric to the barrel 12, rotation of the barrel 12 continually presents a new segment of the barrel for receiving the loops of the strand 11 so that the loops do not pile directly on top of one another.

As indicated supra, the diameter of the loop distributed by the distributor 10 is determined by the dimensions of the barrel 12 and its inner core 35. For a given rate at which the strand 11 is fed from capstan 25 to distributor 10, a predetermined amount of the strand must be distributed in the take-up barrel 12. Thus, once the diameter of the loop is fixed by the dimensions of the barrel, the rate at which the distributor 10 is rotated about the vertical axis 14 is also fixed by the rate at which the capstan 25 delivers the strand to the distributor.

Generally, the faster the distributor is rotated, the smaller the loops of the strand become. On the other hand, the greater the curvature of the curved portion of the distributor 10, the larger the loops will become. After the rate has been set at which the deflector 10 must rotate (it is then necessary to adjust the curvature of the distributor 10 to obtain the proper loop size. In actual practice, the curvature of the curved portion of the deflector 10 is determined by trial and error.

Where a barrel is used having an interior radius B of 11¼ inches and an inner core 35 is used having an outer radius C of 6½ inches, the radius D of the loops of the strand 11 is 8⅞ inches or approximately 9 inches. Using this radius for the loops of the strand 11, the distance A between the vertical axis 14 and the longitudinal axis 13 is approximately 2 inches.

When the strand 11 is fed to the deflector 10 from the capstan 25 at from 1800 to 1900 feet per minute, it will then be necessary to rotate the distributor 10 at from 375 to 400 revolutions per minute to properly distribute the strand in the take-up barrel 12.

It is only necessary to rotate the barrel 12 at a rate sufficient to displace a new portion of the barrel beneath the distributor for each revolution of the distributor. This prevents the loops from piling up on each other and distributes the loops in the barrel in a mat-like manner as illustrated in FIG. 3. A satisfactory distribution has been obtained under the above-enumerated conditions when the barrel 12 is rotated at from 12 to 18 revolutions per minute.

Figure 4:
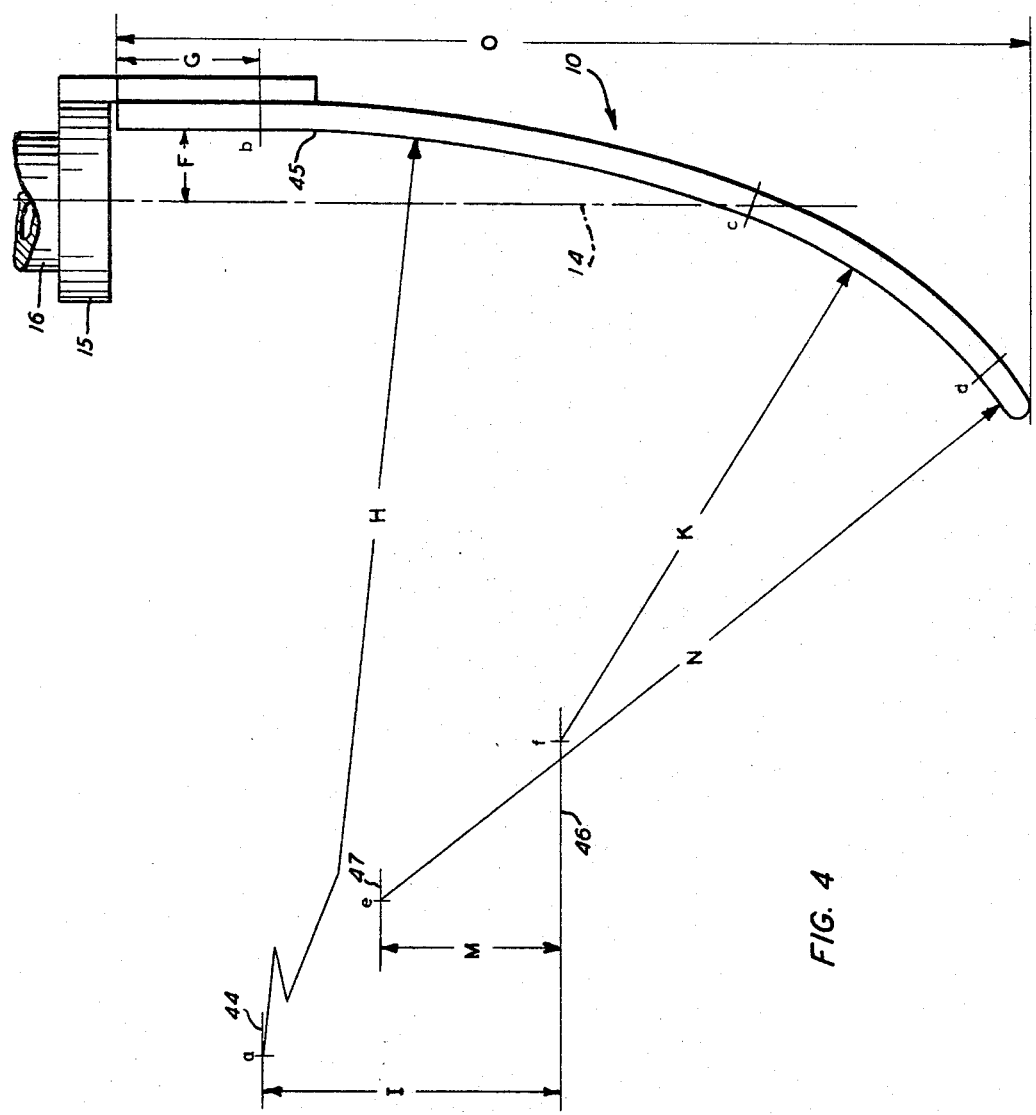
FIG. 4 is an enlarged fragmentary view taken from FIG. 1 showing the details of a deflector utilizing the principles of the instant invention.

The construction of a deflector which will maintain the proper loop size under the above-enumerated conditions is illustrated in FIG. 4. A portion of the deflector 10 is positioned a distance indicated by the letter F from the vertical axis 14; and for a distance indicated by the letter G, the deflector 10 is substantially parallel to the vertical axis 14.

At the distance G from the top of the deflector, a line 44 is drawn perpendicular to the vertical axis 14. This line intersects the face 45 of the deflector at point $b$. Point $a$ lies on line 44 and is spaced from point $b$ a distance indicated by the letter H.

The distance H forms the radius of curvature of the deflector 10 between the points $b$ and $c$. The point $c$ is located in the following manner. Line 46 is drawn parallel to the line 44 a distance indicated by the letter I therefrom. The point $c$ lies on the line connecting points $a$ and $f$ where $f$ is on line 46 and the distance between $f$ and $c$ is indicated by the letter K. The distance K then forms the radius of curvature between the point $c$ and point $d$.

The point $d$ is located in the following manner. A line 47 is drawn between lines 44 and 46 parallel to the line 46 at a distance indicated by the letter M from line 46. The poind $d$ lies on the line connecting points $e$ and $f$ where the distance between points $e$ and $d$ is equal to the distance indicated by the letter N. The distance N from the point $e$ forms the radius of curvature of the deflector 10 for the remainder of the deflector. The deflector 10 has an overall vertical length indicated by the letter O.

As discussed supra, the curvature of the distributor 10 controls the size of the loop distributed in the take-up barrel 12. Proper distribution of the strand in the take-up barrel 12 has been obtained under the above-enumerated conditions when the following approximate dimensions for the deflector 10 are used:

|   | Inches |
|---|---|
| F | 1½ |
| G | 1⁷⁄₁₆ |
| H | 14½ |
| I | 3 |
| K | 5⁹⁄₁₆ |
| M | 1¹³⁄₁₆ |
| N | 8 |
| O | 9¼ |

As discussed supra, the strand 11 generally follows the vertical axis 14 until the strand strikes the deflector 10. It is desirable that the radius of curvature H be very gradual so that the strand 11 will strike the deflector 10 at an oblique angle. By the strand 11 striking the deflector 10 at an oblique angle, resultant forces which act back up along the vertical axis 14 are reduced to a minimum. This is to overcome any tendency of the strand 11 to back up in the hollow shaft 16 as this would block the passage of the strand through the hollow shaft 16.

The strand 11 after striking the deflector 10 is deflected along the lower curved portion of the deflector. It is the curvature of the deflector 10 along its lower portion which determines the size of the loop distributed in the barrel at a given r.p.m. of the deflector. Although the deflector is curved along its vertical dimension, a generally flat plate is used so that the deflector is flat along its horizontal dimension.

It is to be understood that the above-enumerated dimensions and speeds are only illustrative of a single configuration of the invention and that many other dimensions and speeds and ratios of the given dimensions and speeds may be used without departing from the spirit of the invention as will be understood by one skilled in the art.

What is claimed is:
1. A device for deflecting a strand into an open-top container, comprising:
   a plate spaced from and mounted for rotation about a substantially vertical axis, the plate being gradually curved inwardly so as to intersect the vertical axis at an oblique angle, and
   means for rotating the plate about the vertical axis.
2. A device for distributing a strand into an open-top container, comprising:
   a plate spaced from and mounted for rotation about a substantially vertical axis, the plate being gradually curved inwardly so as to intersect the vertical axis at an oblique angle and having a greater curvature below the point of intersection to control the size of the loop formed by the plate when rotated about the vertical axis at a given r.p.m., and
   means for rotating the plate about the vertical axis.
3. A device for distdibuting a strand into an open-top container, comprising:
   means for advancing a strand along a substantially vertical axis,
   a plate having a smooth surface and mounted for rotation about the vertical axis, a portion of the plate being spaced from the vertical axis, the plate being gradually curved inwardly so as to intersect the vertical axis at an oblique angle, and
   means for rotating the plate about the vertical axis.
4. A device for distributing a strand into an open-top container, comprising:
   means for advancing a strand along a substantially vertical axis,
   a plate having a smooth surface and mounted for rotation about the vertical axis, a portion of the plate being spaced from the vertical axis, the plate being gradually curved inwardly so as to intersect the vertical axis at an oblique angle and the portion of the plate lying below the point of intersection having a greater curvature to control the size of the loop formed when the plate is rotated about the vertical axis at a given r.p.m., and means for rotating the plate about the vertical axis.

5. A device for distributing a strand in an open-top container, comprising:

means for advancing a strand along a substantially vertical axis, a smooth plate mounted at its uppermost portion along a line generally parallel to and spaced from the vertical axis, the intermediate portion of the plate being gradually curved so as to intersect the vertical axis at an oblique angle, the lower portion of the plate being curved at a somewhat greater angle below the intersection of the vertical axis to form an enlarged loop in the strand when the plate is rotated about the vertical axis, and means for rotating the plate about its vertical axis.

References Cited by the Examiner

UNITED STATES PATENTS

| | | | |
|---|---|---|---|
| 501,251 | 7/1893 | Kilmer | 242—82 |
| 2,863,208 | 12/1958 | Drummond et al. | 28—21 X |
| 2,983,025 | 5/1961 | Frickert | 28—21 |
| 3,052,010 | 9/1962 | Martin | 28—21 |
| 3,135,038 | 6/1964 | Pflugrad | 28—21 |

DONALD W. PARKER, *Primary Examiner.*

L. K. RIMRODT, *Assistant Examiner.*